United States Patent [19]

Noyes

[11] Patent Number: 5,261,783
[45] Date of Patent: Nov. 16, 1993

[54] KINETIC PUMP HAVING A CENTERLESS IMPELLER

[75] Inventor: Daniel G. Noyes, Houston, Tex.
[73] Assignee: U.S. Water Technologies, Inc., Houston, Tex.
[21] Appl. No.: 805,094
[22] Filed: Dec. 9, 1991
[51] Int. Cl.$^5$ .............................................. F01D 5/00
[52] U.S. Cl. ........................................ 415/71; 415/72; 416/177; 366/156
[58] Field of Search ........................ 415/71, 72, 73, 74, 415/75, 60, 62, 67, 68; 416/176, 177; 366/156, 157, 158, 318

[56] References Cited

U.S. PATENT DOCUMENTS

| | | | |
|---|---|---|---|
| 551,853 | 12/1895 | Desgoffe | 415/72 |
| 860,712 | 7/1907 | Waddell | 415/74 |
| 2,030,560 | 2/1936 | Adams, Jr. | 415/72 |
| 2,240,104 | 4/1941 | Uhri, Jr. et al. | |
| 2,606,150 | 8/1952 | Thorp | |
| 2,835,589 | 5/1957 | Witefield | 366/318 |
| 3,044,077 | 7/1962 | Belden | |
| 3,265,001 | 8/1966 | Deters | 415/68 |
| 3,766,945 | 10/1973 | Pal | |
| 3,897,937 | 8/1975 | Limbach | 415/72 |
| 3,947,359 | 3/1976 | Laurie | |
| 3,993,563 | 11/1976 | Degner | |
| 3,996,958 | 12/1976 | Lajoie | |
| 4,232,973 | 11/1980 | Ligouzat | 366/157 |
| 4,240,990 | 12/1980 | Inhofer et al. | |
| 4,264,039 | 4/1981 | Moreland | |
| 4,271,099 | 6/1981 | Kukla | |
| 4,280,911 | 7/1981 | Durda et al. | |
| 4,285,367 | 8/1981 | Nommensen | |
| 4,293,169 | 10/1981 | Inhofer et al. | |
| 4,297,214 | 10/1981 | Guarnaschelli | |
| 4,308,221 | 12/1981 | Durda | |
| 4,328,107 | 5/1982 | Wright | |
| 4,409,100 | 10/1983 | Rajendren | |
| 4,417,674 | 11/1983 | Giuffredi | |
| 4,430,251 | 2/1984 | Patterson et al. | |
| 4,454,077 | 6/1984 | Litz | |
| 4,477,393 | 10/1984 | Kos | |
| 4,540,528 | 9/1985 | Haegeman | |
| 4,564,457 | 1/1986 | Cairo, Jr. et al. | |
| 4,633,909 | 1/1987 | Louboutin et al. | |
| 4,739,907 | 4/1988 | Gallant | 366/157 |
| 4,764,311 | 8/1988 | Klaes | |
| 4,834,782 | 5/1989 | Silva | |
| 4,882,098 | 11/1989 | Weetman | |
| 4,919,849 | 4/1990 | Litz et al. | |
| 4,931,225 | 6/1990 | Cheng | |
| 5,025,822 | 6/1991 | Guggisberg | |
| 5,043,104 | 8/1991 | Stirling | |

FOREIGN PATENT DOCUMENTS

| | | | |
|---|---|---|---|
| 1208072 | 7/1986 | Canada | 415/72 |
| 0339754 | 11/1986 | European Pat. Off. | |
| 2253551 | 12/1973 | France | |
| 0573583 | 2/1958 | Italy | 415/72 |
| 0366748 | 2/1963 | Switzerland | 415/62 |
| 0915925 | 3/1982 | U.S.S.R. | 366/318 |
| 1606172 | 11/1990 | U.S.S.R. | 366/318 |

OTHER PUBLICATIONS

Aeration Industries, Inc., "Aire-O$_2$ Aeration Systems" Catalog A2-100, 9 pages, published in Chaska, Minn. in 1983.
Encyclopaedia Britannica, Inc., The New Encyclopaedia Britannica, vol. 9, pp. 796–798, 1974–1987, 15th Edition, published in Chicago, Ill., publication date unknown.

(List continued on next page.)

Primary Examiner—Thomas E. Denion
Attorney, Agent, or Firm—Vaden, Eickenroht, Thompson, Boulware & Feather

[57] ABSTRACT

The invention is a kinetic pump having a centerless impeller. The pump comprises a pump body rotated by a powered means either having a rotatable shaft or driving a peripheral belt drive. The pump body has a recess formed therein as well as at least one slot that fluidly connects the recess with the environment in which the pump operates. A means for imparting kinetic energy is formed in the wall of the recess to pump the fluid through the recess and the slots.

9 Claims, 3 Drawing Sheets

U.S. PATENT DOCUMENTS

WestCoast Rotor, Inc., WestCoast Rotor Brochure, "The Economical Alternative of Quality Components for Progressing Cavity Pumps", 4 pages, published in Gardena, Calif., publication date unknown.

Dresser Pump Division, Dresser Industries, Inc., Monoflo Progressing Cavity Pumps Manual, "Monoflo Merlin Pump Family", SLMP/003/09 R1, 8 pages, published in Chesapeake, Va. in May 1991.

Dresser Pump Division, Dresser Industries, Inc., Monoflo Progressing Cavity Pumps Manual, 2050-3 p. 1, published in Chesapeake, Va. in Aug. 1991.

Dresser Pump Division, Dresser Industries, Inc., Monoflo Progressing Cavity Pumps Manual, "Monoflo Merlin Industrial Pump Range", SLMP/006/09 R1, 10 pages, published in Chesapeake, Va. in May 1991.

Dresser Pump Division, Dresser Industries, Inc., Monoflo Progressing Cavity Pumps Manual, "Monoflo The Industrial E Range", SLMP/004/09 R1, 12 pages, published in Chesapeake Va. in May 1991.

Dresser Pump Division, Dresser Industries, Inc., Monoflo Progressing Cavity Pumps Manual, "Monoflo Merlin Widethroat Pump Range", SLMP/007/09R1, 10 pages, published in Chesapeake, Va. in May 1991.

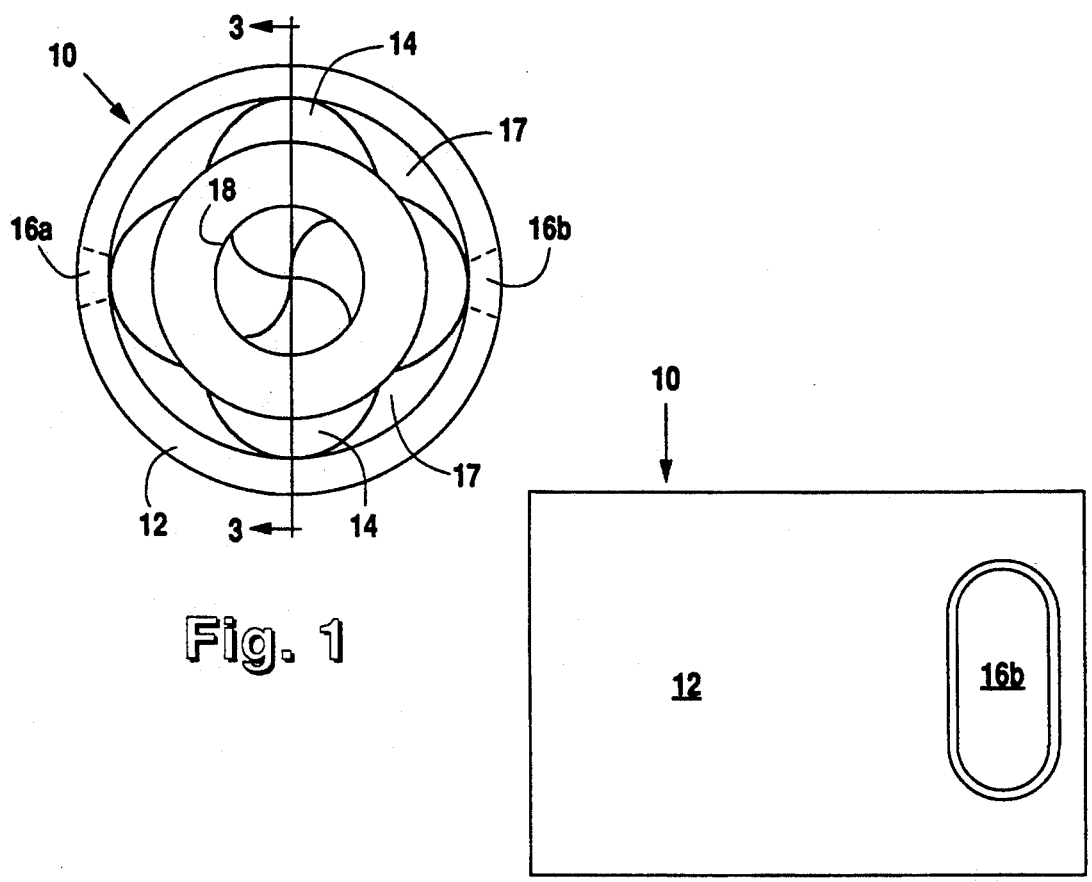
Fig. 1
Fig. 2
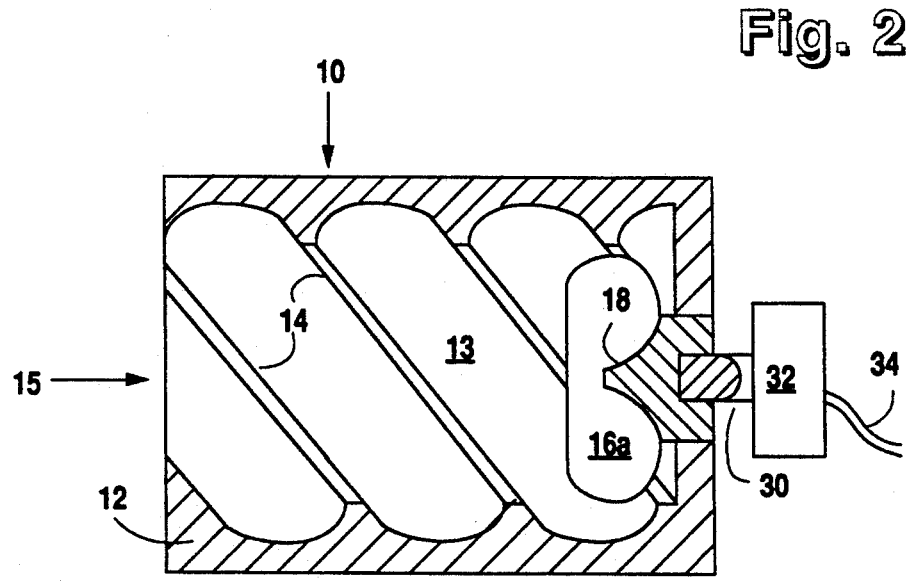
Fig. 3

KINETIC PUMP HAVING A CENTERLESS IMPELLER

BACKGROUND OF THE INVENTION

1. Field of the Invention

This invention pertains to a new kinetic pump having a centerless impeller.

2. Description of the Prior Art

Pumps may be generally classified according to their mode of operation i.e., volumetric displacement, addition of kinetic energy, and use of electromagnetic force. There are also lesser known pump classifications such as such as gas lift, blow case, jet ejector, hydraulic ram, and vacuum pumps. Among the three more common types, kinetic pumps are generally characterized by the use of impellers to pump high volumes of fluids at low pressures either by rapidly rotating the impeller or by imparting an impulse to the fluid in the direction of its flow.

Their are two general subclasses of kinetic pumps. The first subclass is centrifugal pumps, which class includes radial pumps, axial pumps and mixed flow pumps. A second subclass is regenerative pumps which are sometimes called turbine or peripheral pumps. Both subclasses of kinetic pumps utilize an impeller centrally mounted to a rotatable shaft, significantly differing only in the design of the impellers vanes.

The use of impellers in both subclasses of kinetic pumps creates problems that commonly plague this class. For instance, the centrally mounted impeller impedes solids handling so that kinetic pumps are prone to clogging when handling solutions containing solids. Also, pumping characteristics can only be altered by changing the revolutions-per-minute of the rotatable shaft on which the impeller is mounted. Finally, kinetic pumps are not reversible because impeller vanes are designed for pumping in only one direction, which leads to vast loss of pumping efficiency when reversed.

It is therefore a feature of this invention to provide an improvement in a kinetic pump by not utilizing a centrally mounted impeller.

It is also a feature of this invention to provide an improvement in increased capability in handling solids containing solutions over known kinetic pumps.

It is a still further feature of this invention to provide an improvement in pumping efficiency that increases with the viscosity of the fluid being pumped.

It is furthermore a feature of this invention to provide an improvement in pumping characteristics that are independent of the revolutions-per-minute of the pump and are infinitely variable.

SUMMARY OF THE INVENTION

The invention is a kinetic pump having a centerless impeller and comprising a pump body rotated by a powered means such as by a rotatable shaft or a peripheral belt drive. The pump body has a recess formed therein as well as at least one slot that fluidly connects the recess with the environment in which the pump operates. A means for imparting kinetic energy is formed in the wall of the recess to pump the fluid through the recess and the slots.

A BRIEF DESCRIPTION OF THE DRAWINGS

A more particular description of the invention briefly summarized above may be had by reference to the exemplary preferred embodiment illustrated in the drawings of this specification so that the manner in which the above cited features, as well as other which will become apparent, are obtained and can be understood in detail. The drawings form a part of this specification but nevertheless illustrate only typical, preferred embodiments of the invention and are therefore not to be considered limiting of its scope as the invention may admit to other equally effective embodiments.

In the drawings:

FIG. 1 is an end view of the preferred embodiment of the invention;

FIG. 2 is a side view of the preferred embodiment depicted in FIG. 1;

FIG. 3 is a partial cut-away view of the preferred embodiment of the invention as viewed along line 3—3 in FIG. 1;

DESCRIPTION OF THE PREFERRED EMBODIMENT

Figure 4:
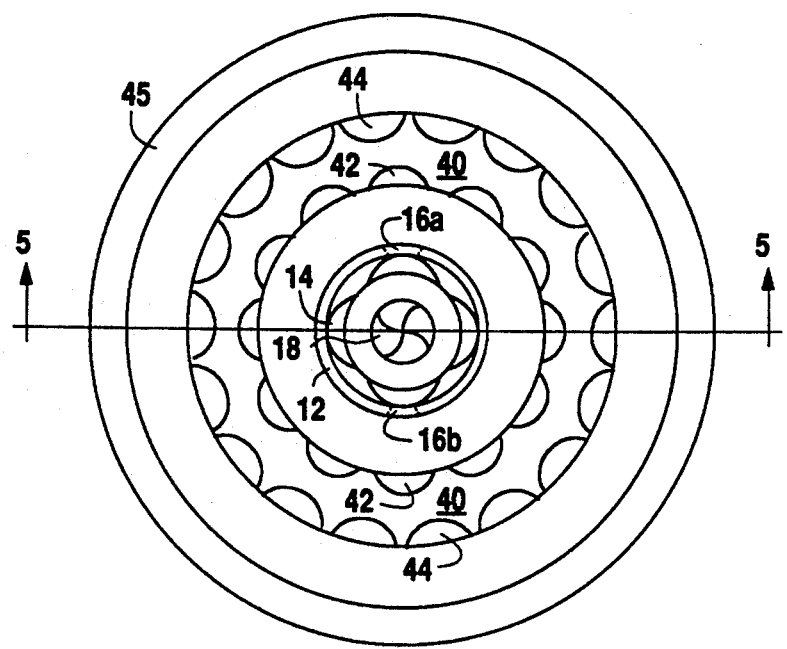
FIG. 4 is an end view of an alternative embodiment of the invention.

The new kinetic pump is illustrated in FIGS. 1-3. The pump of the present invention, generally denoted as 10, comprises pump body 12 fixedly mounted to rotatable shaft 30 of powered rotating means 32. Powered rotating means 32 may also be implemented as a peripheral belt drive as is well known to those in the art. Body 12 is mounted to shaft 30 by nut 18 which is threadably engaged with the end of rotatable shaft 30. Powered means 32 is preferably an electric motor powered by electrical current received via power cord 34. In the preferred embodiment, powered means is an electric motor manufactured by Ebara and sold to the general public as Model No. 50EY3U6.4.

As shown best in FIG. 3, body 12 has recess 13 formed therein. Means for imparting kinetic energy 14 is formed in the walls of recess 13 and in the preferred embodiment is a helical screw. Imparting means 14 may also be a segmented helical screw, an inclined paddle, or other equivalent structure as may be well known to those in the art. Slots 16a-b are formed in the wall of body 12 to fluidly connect recess 13 with the environment in which body 12 of pump 10 operates.

The optimal design of imparting means 14 and slots 16a-b will depend upon the viscosity, abrasiveness, density, and specific gravity of the fluid being pumped. Pump 10 of FIG. 3 employs a helical screw for imparting means 14 and is designed for use with fluids having a viscosity slightly higher than water. The cross-sectional area of the groove is semi-circular, although other geometries may be desirable, and the pitch of the screw is relatively constant.

As an example of how the preferred embodiment may be modified for specific fluids, the helix of the screw of imparting means 14 should be tighter (i.e., more turns per inch) than is shown in FIG. 3 for fluids having a viscosity much higher than water. For fluids that are highly abrasive, the grooves of the helical screw of imparting means 14 should be much deeper than is shown in FIG. 3. Alternative geometries such as elliptical or annular may be desirable for the groove of the screw.

Slots 16a-b shown in FIG. 3 also have a smaller interior circumference than exterior circumference. In the preferred embodiment depicted, this difference in circumference and the particular "oval" shape of slots 16a-b illustrated are not critical to the performance of pump 10. It is nevertheless anticipated that the shape and design of slots 16a-b in some alternative embodiments may be important factors in the performance of the pump.

Figure 5:
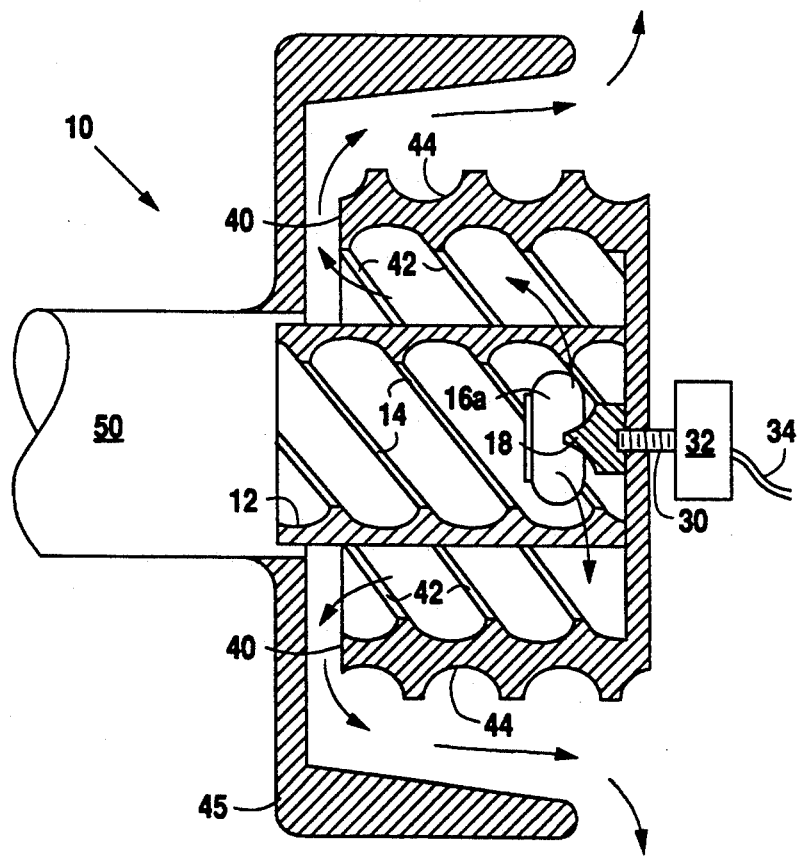
FIG. 5 is a side view and partial cut-away of the embodiment of FIG. 4 along line 5—5 of FIG. 4.
Figure 6:
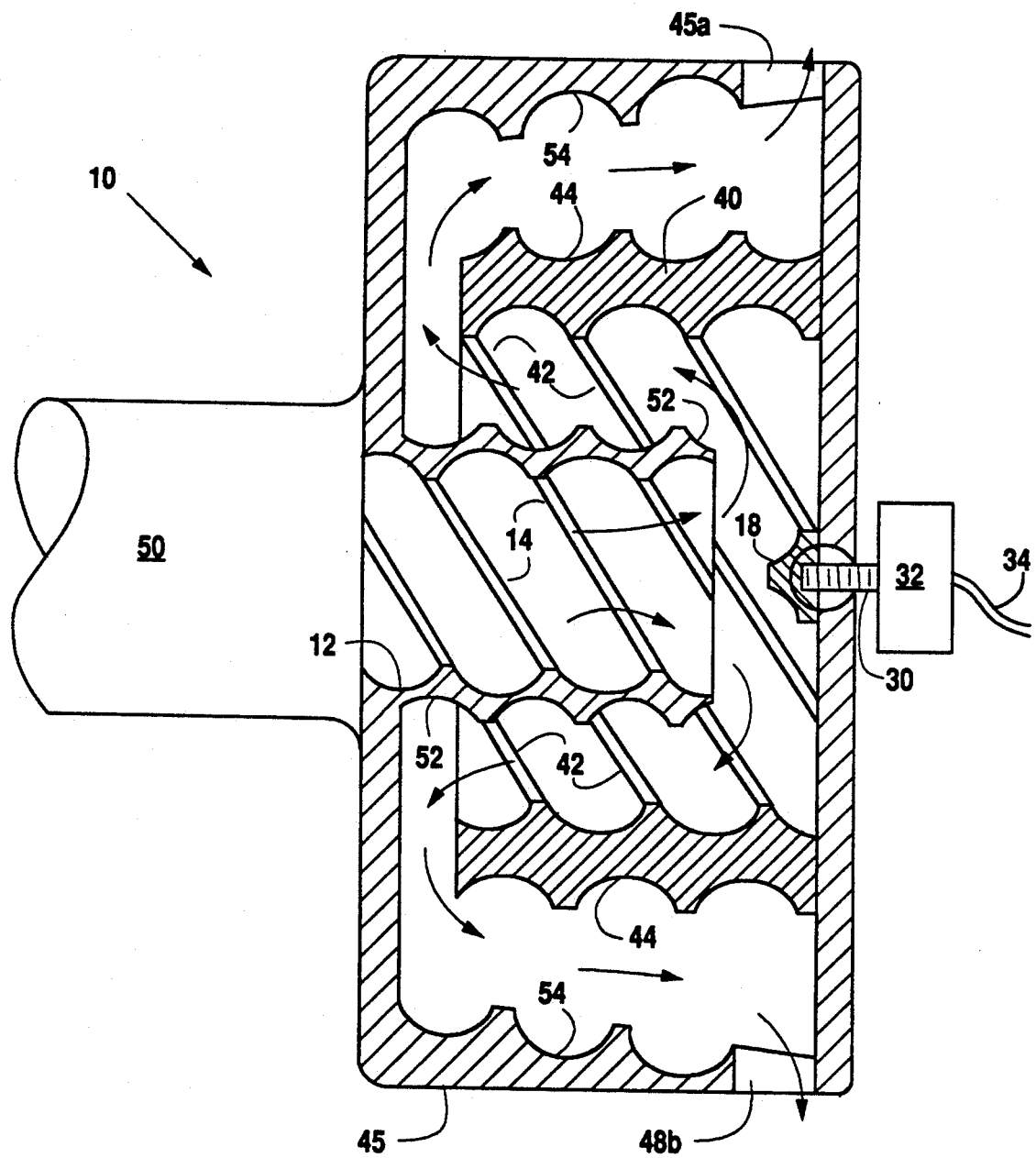
FIG. 6 is a side view and partial cutaway view of a second alternative embodiment of the invention.

In embodiments employing a helical screw for imparting means 14, the angle, or pitch, of the screw will also affect performance. Although the preferred embodiment of pump 10 in FIGS. 1-3 and the alternative embodiments of FIGS. 4-6 illustrate imparting means 14 as a helical screw of relatively constant pitch, screws having variable pitch may have greater performance for some fluids. The screw of imparting means 14 may, for instance, begin with a relatively tight spiral and gradually loosen until it concludes in a relatively loose spiral.

In summary, the performance of pump 10 in any one embodiment will depend on the viscosity, abrasiveness, density, and specific gravity of the fluid being pumped. The performance of pump 10 for any given fluid can be enhanced by tailoring the depth, shape, and length of the helix of the screw of imparting means 14. The preferred embodiments of pump 10 in FIGS. 1-6 have been designed for use with fluids having a viscosity slightly higher than water and can be adapted to perform more efficiently with other fluids.

However, the exact inter-relationship of these factors is yet not fully understood so that the manner in which the structure of pump 10 must be changed to "match" particular fluids cannot be determined. The following general rules for the design of imparting means 14 have been ascertained:

1) the tightness of the screw (i.e., the number of turns per inch) should vary directly with the viscosity of the fluid;

2) the depth of the grooves of the screw should vary directly with the abrasiveness of the fluid; and 3) the length of the screw should vary directly with the density and specific gravity of the fluid.

In operation, body 12 of pump 10 is immersed in a fluid (not shown) in a manner well known to those in the art. Imparting means 14, when body 12 is rotated in a clockwise direction, pumps the fluid from left to right in the direction of arrow 15 of FIG. 3. The fluid is pumped through recess 13 and slots 16a-b by the interaction of the fluid and the rotating imparting means 14.

Because imparting means 14 in the preferred embodiment is a helical screw, pump 10 is fully reversible without loss of pumping efficiency simply by rotating body 12 in a counter-clockwise direction provided that powered means 32 is fully reversible. Furthermore, the pumping characteristics of pump 10 can be variable without changing the revolutions per minute of rotatable shaft 30 because the amount of kinetic energy imparted by a helical screw (or segmented helical screw or inclined paddle) is dependent on the proportion of the screw that operates on the passing fluid. Thus, the pumping characteristics of pump 10 may be varied by changing the point in recess 13 at which pump 10 meets the fluid being pumped.

For instance, if the fluid being pumped is introduced to pump 10 via a fluid bearing conduit, the pumping characteristics can be altered by discharging the fluid from the fluid bearing conduit at different points in recess 13. Finally, because means for imparting kinetic energy 14 is formed in the walls of recess 13 rather than being embodied in a conventional impeller, pump 10 is relatively impervious to clogging and has vastly improved solids handling capabilities. Pump 10 consequently also more efficiently handles fluids having high viscosity, which is the converse of most kinetic pumps.

An embodiment of pump 10 extrapolating the above teachings to achieve higher pumping efficiencies is illustrated in FIGS. 4-5, with arrows in FIG. 5 illustrating fluid flow through pump 10. FIGS. 4-5 show an embodiment of pump 10 in which body 12 rotates in a clockwise direction within jacket 40 which in turn rotates in a counterclockwise direction within housing 45 and to which fluid is delivered via fluid bearing conduit 50. The means for rotating jacket 40 and housing 45 is not shown, but powered means 32 may be easily modified by those of ordinary skill in the art to rotate both body 12 and jacket 40 in their respective directions.

As is most easily seen in FIG. 5, jacket 40 has means for imparting kinetic energy 42 formed in its interior wall and means for imparting kinetic energy 44 formed in its exterior wall. Having an imparting means formed in both the exterior wall and the interior wall greatly increases the pumping efficiency attributable to jacket 40. Fluid consequently flows through pump 10 after exiting fluid bearing conduit 50, passing through recess 13 of body 12, through slots 16a-b into the recess of body 40, exiting the recess of body 40 into the recess of housing 45, and out of housing 45.

FIG. 6 illustrates how these principles may be extrapolated beyond the embodiment of FIGS. 4-5, with arrows illustrating fluid flow through pump 10. In FIG. 6, body 12 has means for imparting kinetic energy 52 formed in its exterior surface and housing 45 has means for imparting kinetic energy 54 formed in the wall of its recess and slots 48a-b through which the fluid being pumped exits the recess of housing 45. Body 12, in this embodiment, does not have slots 16a-b but is instead open on the end opposite fluid bearing conduit 50 to allow egress of the fluid being pumped. Furthermore, housing 45 rotates in a clockwise direction, as does body 12, while jacket 40 rotates in a counterclockwise direction.

The pumping efficiency of the pump is dependent upon the amount of rotating means for imparting kinetic energy with which the fluid interacts as well as the design of the imparting means. Thus, teachings of the invention can be still further extrapolated to achieve higher pumping efficiencies by rotating body 12, jacket 40, and housing 45 within still more layers of housings having imparting means formed in the interior and exterior walls. However, complexities in manufacturing and assembly practically constrain such extrapolation to some degree. These and other such variations will become apparent to those in the art having the benefits of the teachings herein and are to be considered within the scope and spirit of the invention disclosed and claimed herein.

What is claimed is:

1. A kinetic pump comprising:
a body having a recess in which a means for imparting kinetic energy and at least one opening are formed, the opening permitting fluid pumped through the recess by the imparting means to exit the recess and the imparting means leaving the recess unobstructed; and
powered means for rotating said body, said rotating means leaving the recess unobstructed.

2. The kinetic pump of claim 1 wherein said pump body also has a means for imparting kinetic energy formed in an exterior surface of said pump body to impart additional pumping force to the fluid exiting the recess.

3. The apparatus of claims 1 or 2, wherein the imparting means is at least one of a helical screw, a segmented helical screw, and a inclined paddle.

4. The pump of claims 1 or 2, wherein said pump body rotates within a jacket having an opening to permit the fluid to exit the jacket, an inner wall of the jacket having a means for imparting kinetic energy formed therein to impart additional pumping force to the fluid exiting the recess.

5. The pump of claim 4, wherein the jacket rotates.

6. The pump of claim 4, wherein the imparting means formed in the inner wall of the jacket is at least one of a helical screw, a segmented helical screw, and an inclined paddle.

7. The pump of claim 4, wherein the jacket rotates within a housing.

8. The pump of claim 7, wherein a means for imparting kinetic energy is formed in an exterior surface of the jacket to impart additional pumping force to the fluid exiting the recess.

9. The apparatus of claim 8, wherein the imparting means formed in the exterior surface of the jacket is at least one of a helical screw, a segmented helical screw, and an inclined paddle.

* * * * *